Patented June 30, 1936

2,045,949

UNITED STATES PATENT OFFICE 2,045,949

METHOD OF PREPARING MEAT AND FISH EXTRACTS

Kiyonobu Hatta, Sakyoku, Kyoto, Japan

No Drawing. Application July 3, 1934,
Serial No. 733,681

2 Claims. (Cl. 99—110)

This invention relates to the method of preparing meat and fish extracts, characterized by adding the juice extracted from meat and fish to the liquor extracted from the seaweeds containing iodine in which a mucous substance is first removed, and then concentrating the mixture. The object thereof is to fit the meat and fish extracts which are easy to decay, for long preservation in a fluid state.

In order to preserve the meat and fish without losing their flavor, it is most advisable to turn them into extracts. Generally, the meat and fish extracts stand fairly long preservation when in a highly viscous condition, or when in a solid or powdered condition, but as a comparatively high heating temperature and much time are required in the operation, the products so treated seldom retain their natural flavor. If it is desired to reduce both the heating temperature and time of the process so as to maintain the natural flavor of the meat and fish extracts, nothing is better than to turn them into a fluid state, but as is well known, in such a state it is absolutely impossible to make them stand long preservation.

Applicant has discovered that the liquor extracted from seaweeds containing iodine has strong antiseptic power when it is evaporated and concentrated after the mucous substance has first been removed, and is then mixed with the meat, the fish extracts or juice and resultant mixture thereafter being evaporated and concentrated, whereby the meat and fish extracts, even if kept in a fluid condition at about 20° Bé., stand permanent preservation and are freed from the necessity of evaporation and drying into a solid or semi-solid state. Thus, the heating temperature and time are reduced and the fear of the loss of the natural flavor of the meat and fish is removed.

The following is an example of carrying out this invention into practice:—

|  | Parts by weight |
|---|---|
| "Kombu" (tangle) | 100 |
| Boiled water | 1,000 |

Evaporate the above liquor up to about 30° Bé. and remove a mucous substance by adding casein or other albuminous solution. Then, clarify the liquor by adding protein hydrolyzing ferment, for instance, trypsin. On the other hand, evaporate the liquor obtained from

|  | Parts by weight |
|---|---|
| Fish | 100 |
| Boiled water | 1,000 | up to 20° Bé. and mix therewith the liquor extracted from "kombu" (tangle) from which the above mucous substance has been removed, although a suitable quantity of common salt may be added, if necessary.

I claim:

1. Method of preparing meat and fish extracts, comprising adding as an antiseptic material to the juice extracted from the meat and fish the liquor obtained by boiling and concentrating the extracted liquor of seaweed rich in iodine after the addition of albuminoid substance, thus precipitating mucous substance, and then after removing the same, dissolving an excess of albuminoid substance with protein hydrolyzing enzyme.

2. Method of preparing meat and fish extracts, comprising using as an antiseptic material, the liquor obtained by boiling and concentrating the extracted liquor of seaweed rich in iodine after the addition of albuminoid substance, thus precipitating mucous substance, and then after removing the same, dissolving an excess of albuminoid substance with protein hydrolyzing enzyme, mixing the said antiseptic material with the juice extracted from the meat and fish and then concentrating the mixture by evaporation.

KIYONOBU HATTA.